Patented Nov. 17, 1953

2,659,744

UNITED STATES PATENT OFFICE 2,659,744

11 ALPHA, 17 ALPHA, 21-TRIHYDROXY-ALLOPREGNANE AND ITS ESTERS

William P. Schneider, Kalamazoo, Mich., assignor to The Upjohn Company, Kalamazoo, Mich., a corporation of Michigan No Drawing. Application October 1, 1952, Serial No. 312,660

4 Claims. (Cl. 260—397.4)

This invention relates to a new compound, 11α,17α,21 - trihydroxyallopregnane - 3,20 - dione and esters thereof, having pharmacological activity and utility in the synthesis of corticosterone, cortisone and other 11-oxygenated steroids. An object of this invention is to provide the novel 11α,17α,21 - trihydroxyallopregnane-3,20-dione and esters thereof.

The novel 11α,17α,21-trihydroxyallopregnane-3,20-dione of the present invention may be represented by the following structural formula:

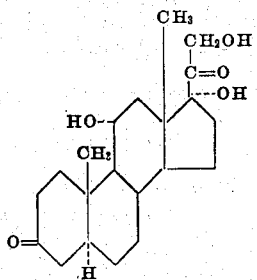

It may be prepared by the hydrogenation of 11α,17α,21 - trihydroxy - 4 - pregnene - 3,20-dione, a product disclosed in the Murray and Peterson United States Patent No. 2,602,769, of July 8, 1952, with hydrogen, at atmospheric or elevated temperature and pressure, and a hydrogenation catalyst, for example, palladium. The time and conditions of reaction are selected to minimize undesirable side reactions.

The following examples are illustrative of the processes and products of this invention and are not to be construed as limiting.

*Example 1.—11α,17α,21-trihydroxyallopregnane-3,20-dione*

A mixture of 800 milligrams of 11α,17α,21-trihydroxy-4-pregnene-3,20-dione, fifty milliliters of 95 percent ethanol, and 100 milligrams of five percent palladium on charcoal catalyst was shaken with hydrogen at atmospheric pressure and room temperature. The uptake of hydrogen stopped at 44 minutes. After 69 minutes, the mixture was removed from the shaker, filtered, and the alcohol was evaporated in a current of air, leaving a colorless solid residue having a melting point of 190 to 200 degrees centigrade. Four recrystallizations from a mixture of methanol and ether yielded ninety milligrams of 11α,17α,21-trihydroxypregnane-3,20-dione having a melting point of 220 to 222 degrees centigrade.

*Analysis.*—Calculated for $C_{21}H_{32}O_5$: C, 69.20; H, 8.85. Found: C, 69.07; H, 8.61.

The mother liquor from the above recrystallizations was evaporated to dryness to leave a residue having a melting point of 175 to 195 degrees centigrade. A 217-milligram portion of this residue was dissolved in fifty milliliters of acetone and chromatographed over 25 grams of a mixture of two parts of Celite diatomaceous earth and one part of Darco G-60 activated carbon. Elution with a total of 800 milliliters of acetone gave 138 milligrams of 11α,17α,21-trihydroxypregnane-3,20-dione having a melting point of 195 to 207 degrees centigrade. Elution again with 600 milliliters of methylene chloride, and evaporation of the solvent from the eluate gave 56 milligrams of crude crystals having a melting point of 220 to 225 degrees centigrade. Recrystallization twice from acetone gave 11α,17α,21 - trihydroxyallopregnane - 3,20 - dione having a melting point of 228 to 230 degrees centigrade. Infrared spectra showed this allo isomer to be different from the normal isomer obtained above, and the curve was consistent with that expected for the allo isomer.

*Analysis.*—Calculated for $C_{21}H_{32}O_5$: C, 69.20; H, 8.85. Found: C, 68.83; H, 8.52.

The 11α,17α,21 - trihydroxyallopregnane - 3,20-dione of this invention is useful in the synthesis of the physiologically active adrenosterone. For example, oxidation of 11α,17α,21-trihydroxyallopregnane-3,20-dione with chromium trioxide in acetic acid splits off the side chain and oxidizes the eleven hydroxyl group to a ketone to give 3,11,17-androstantrione which can be converted to adrenosterone according to the procedure of Djerassi et al., J. Am. Chem. Soc., 72, 4077 (1950). The 11α,17α,21 - trihydroxyallopregnane - 3,20-dione and esters of this invention demonstrate pharmacological and hormonal activity including inhibitory cortisone activity.

Novel esters of 11α,17α,21-trihydroxyallopregnane-3,20-dione may also be prepared. The starting 11α,17α,21-trihydroxyallopregnane-3,20-dione is admixed with an acylating agent such as, for example, ketene, a ketene of a selected acid, an acid, acid chloride or acid anhydride, or other known acylating agent, usually in a solvent such as, for example, pyridine or the like, or an inert solvent, including solvents like benzene, toluene, ether, and the like, for example, and heated at a temperature between about zero degrees centigrade and the boiling point of the reaction mixture, usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The thus-described acylation process, which is illustrated in more detail in the example following in this specification, produces both the mono-esters and the di-esters, although in different proportions, depending upon the proportions of acylating agent to 11α,17α,21-trihydroxyallopregnane-3,20-dione. Using approximately one equivalent of acylating agent to said steroid produces predominantly the mono-acylated product, whereas with about two or more equivalents of acylating agent to said steroid, the predominant product is the diacylated product.

*Example 2.—11α,21-diacetoxy-17α-hydroxyallopregnane-3,20-dione*

In a mixture of four milliliters of acetic anhydride and two milliliters of absolute pyridine, forty milligrams of 11α,17α,21-trihydroxyallopregnane-3,20-dione is dissolved. The reaction mixture is maintained at room temperature for sixteen hours and then poured into sixty milliliters of cold water. The 11α,21-diacetoxy-17α-hydroxyallopregnane-3,20-dione thus formed is collected in methylene chloride by extracting three times with thirty-milliliter portions of methylene chloride. Then the extract is washed with successive ten-milliliter portions, twice with five percent sodium hydroxide and four times with water to obtain an essentially neutral methylene chloride solution of product. The product is isolated from the reaction mixture by distilling the acetic anhydride, acetic acid, and pyridine from the reaction mixture at reduced pressure and crystallizing the distillation residue from the methylene chloride.

In a similar manner, other esters of 11α,17α,21-trihydroxyallopregnane-3,20-dione are prepared according to the described acylation procedures. Representative esters of 11α,17α,21-trihydroxyallopregnane-3,20-dione thus-prepared include one to eight carbon atom carboxylic acid acyloxy esters of saturated or unsaturated, aliphatic, carbocyclic, or cycloaliphatic, aryl, aryl-alkyl, alkaryl, mono, di or polycarboxylic acids which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, napthoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like, if desired.

We claim:
1. A compound selected from the group consisting of 11α,17α,21-trihydroxyallopregnane-3,20-dione and its esters of hydrocarboncarboxylic acids having from one to eight carbon atoms inclusively.
2. 11α,17α,21-trihydroxyallopregnane-3,20-dione esters of hydrocarbon-carboxylic acids having from one to eight carbon atoms inclusively.
3. 11α,21-diacetoxy-17α-hydroxyallopregnane-3,20-dione.
4. 11α,17α,21-trihydroxyallopregnane-3,20-dione.

WILLIAM P. SCHNEIDER.

References Cited in the file of this patent
UNITED STATES PATENTS

| Number | Name | Date |
|---|---|---|
| 2,602,769 | Murray et al. | July 8, 1952 |